United States Patent [19]

Omori et al.

[11] 4,290,850
[45] Sep. 22, 1981

[54] METHOD AND APPARATUS FOR CONTROLLING FEEDWATER FLOW TO STEAM GENERATING DEVICE

[75] Inventors: Takashi Omori, Kitaibaraki; Takao Sato, Tokaimura, both of Japan

[73] Assignee: Hitachi, Ltd., Tokyo, Japan

[21] Appl. No.: 70,819

[22] Filed: Aug. 29, 1979

[30] Foreign Application Priority Data

Sep. 1, 1978 [JP] Japan .............................. 53-106260
Feb. 26, 1979 [JP] Japan ................................ 54-20835

[51] Int. Cl.$^3$ .............................................. G21C 7/00
[52] U.S. Cl. .................................................. 176/20 R
[58] Field of Search ................................ 176/20 R, 24

[56] References Cited

U.S. PATENT DOCUMENTS

| | | | |
|---|---|---|---|
| 3,284,312 | 11/1966 | West | 176/20 R |
| 4,000,037 | 12/1976 | Nusbaum et al. | 176/20 R |
| 4,050,418 | 9/1977 | Watanabe | 176/20 R |
| 4,061,533 | 12/1977 | Purrant | 176/20 R |
| 4,104,117 | 8/1978 | Parziale et al. | 176/20 R |
| 4,108,720 | 8/1978 | Sato et al. | 176/20 R |

FOREIGN PATENT DOCUMENTS

| | | | |
|---|---|---|---|
| 2753673 | 6/1978 | Fed. Rep. of Germany | 176/20 R |
| 2803000 | 8/1978 | Fed. Rep. of Germany | 176/20 R |
| 52-40294 | 3/1977 | Japan | 176/20 R |
| 52-43099 | 4/1977 | Japan | 176/20 R |
| 52-52094 | 4/1977 | Japan | 176/20 R |
| 54-140696 | 11/1979 | Japan | 176/20 R |

*Primary Examiner*—S. A. Cangialosi
*Attorney, Agent, or Firm*—Craig and Antonelli

[57] ABSTRACT

A method and an apparatus for controlling feedwater flow to a steam generating device in a tripped condition of the steam generating device are disclosed. The method comprises the steps of arithmetically calculating a first forecast length of time required for the water level in the steam generating device to attain its desired normal operation level on the basis of the detected water level and the rate of variation of the water level when the detected water level in the steam generating device is lower than the desired normal operation level, the detected flow rate of feedwater is larger than that of the main steam, and the rate of water level variation is positive, arithmetically calculating a second forecast length of time required for the flow rate of feedwater to decrease to a predetermined flow rate on the basis of the detected feedwater flow rate, the detected main steam flow rate and a substantially constant rate of variation of the flow rate of feedwater when the detected feedwater flow rate is larger than the detected main steam flow rate, decreasing the level of the output signal of a ramp signal generator at a rate of variation corresponding to the substantially constant rate of feedwater flow rate variation when the time difference obtained by subtracting ½ of the second forecast length of time from the first forecast length of time becomes zero or negative, and selecting either the output signal of the water level controller for generating a control output signal on the basis of various input signals applied thereto including an input signal indicative of the flow rate of main steam, an input signal indicative of the flow rate of feedwater, and an input signal indicative of the water level in the steam generating device or the output signal of the ramp signal generator means, which has a lower value than the other, to deliver it as the feedwater flow rate demand signal, whereby the water level in the steam generating device is reliably stabilized at its normal operation level upon disappearance of the transient phenomenon appeared as a result of the trip.

4 Claims, 24 Drawing Figures

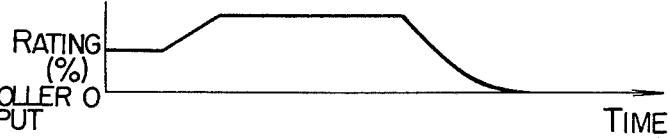
FIG. 3a PRIOR ART
PLANT TRIP SIGNAL
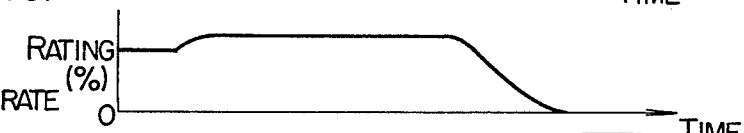
FIG. 3b PRIOR ART
WATER LEVEL CONTROLLER OUTPUT
FIG. 3c PRIOR ART
FEEDWATER FLOW RATE
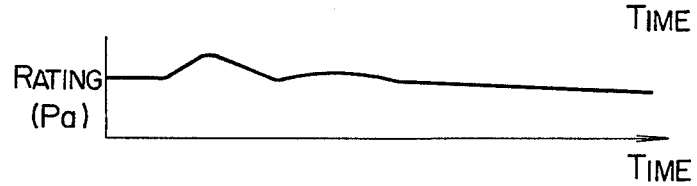
FIG. 3d PRIOR ART
REACTOR WATER LEVEL
FIG. 3e PRIOR ART
REACTOR INTERNAL PRESSURE
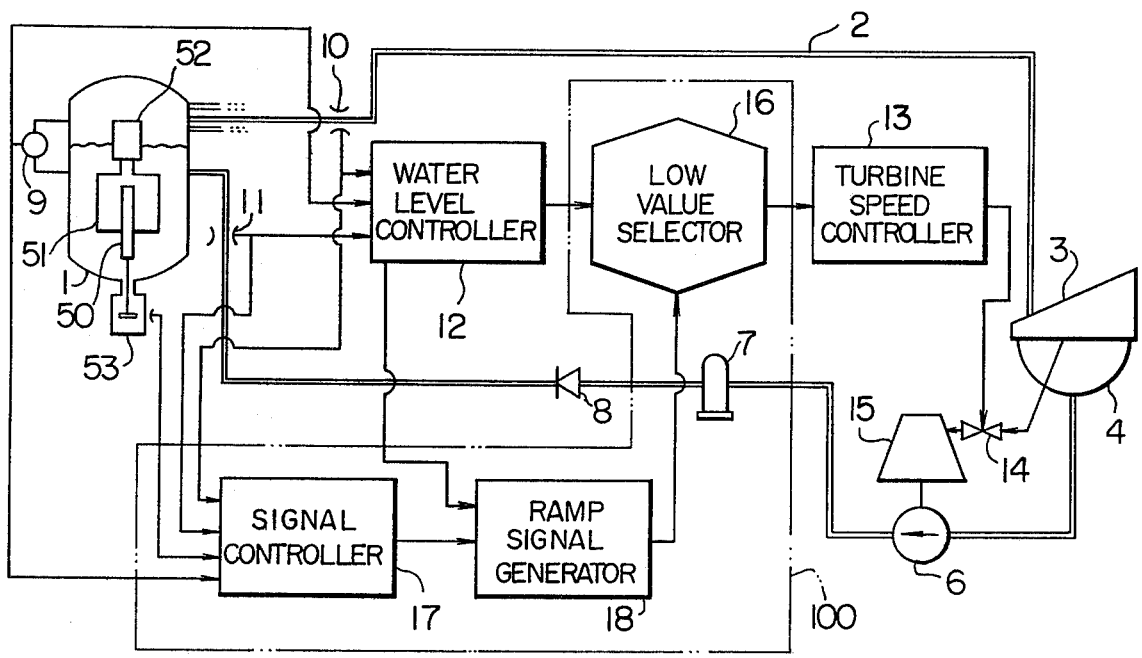
FIG. 4

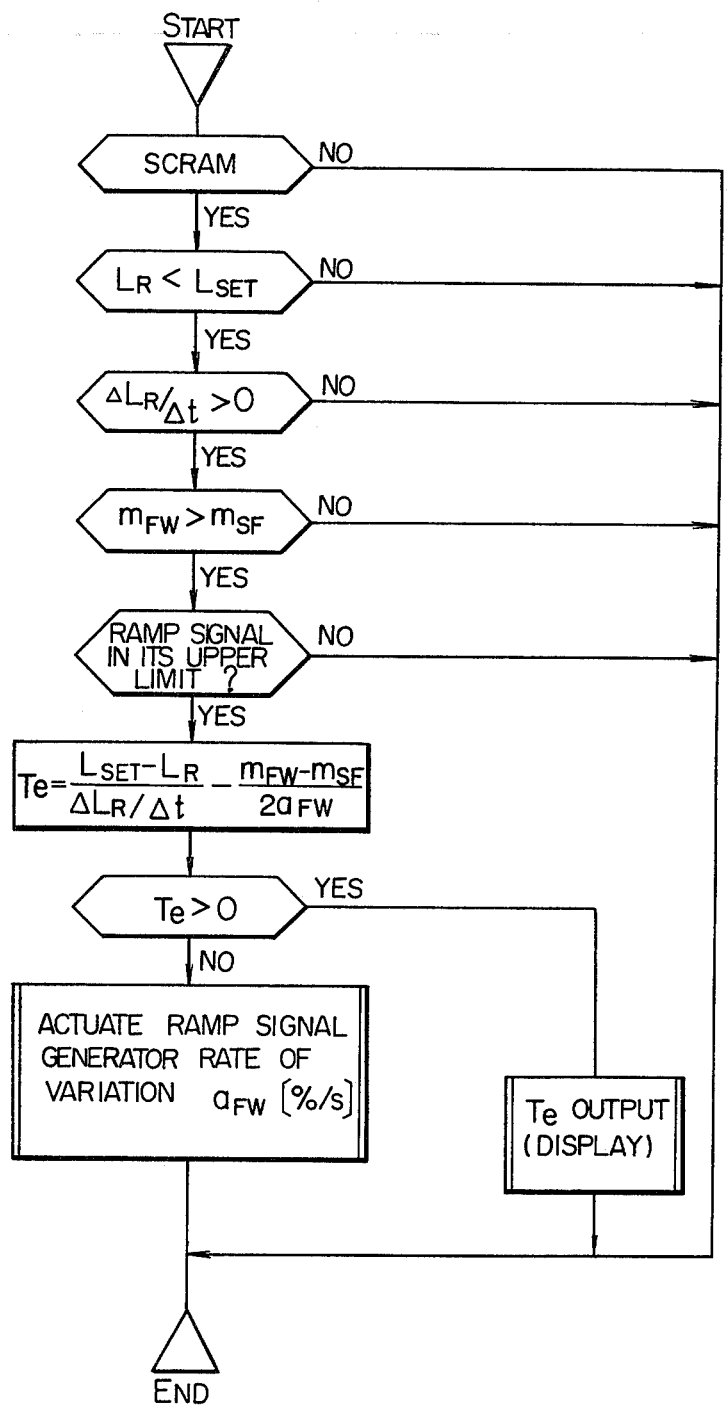

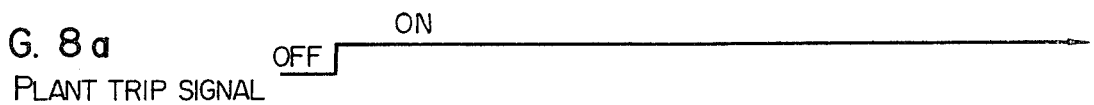
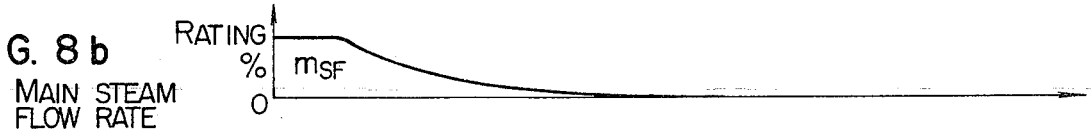
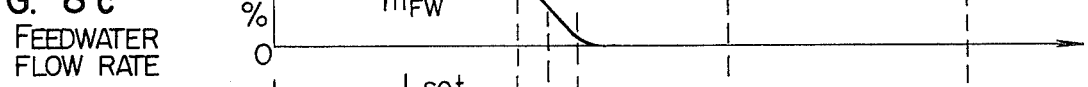
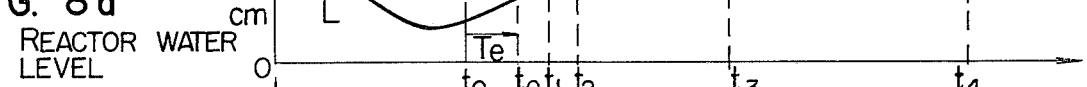
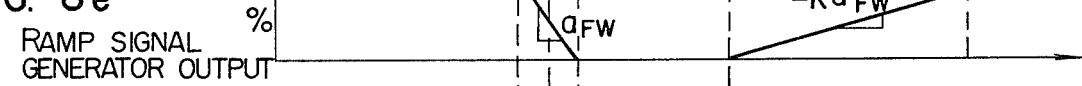
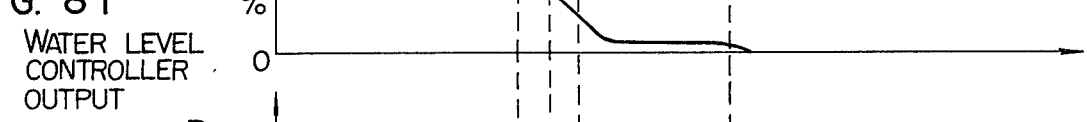
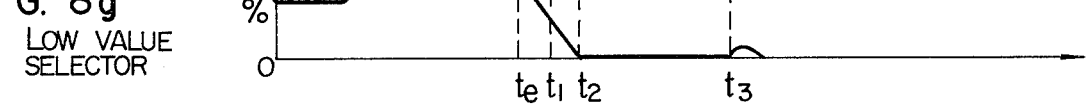
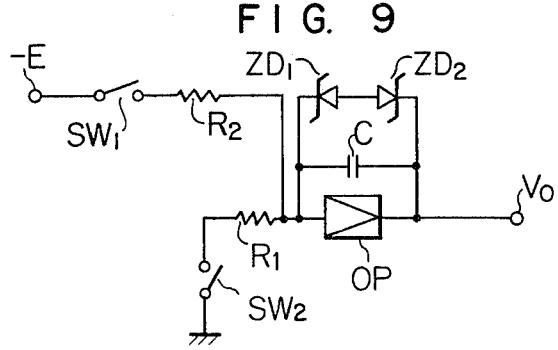

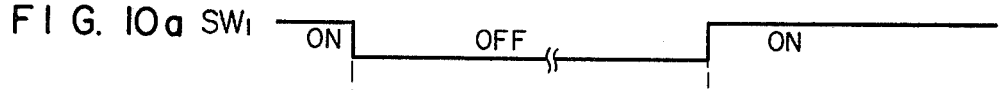
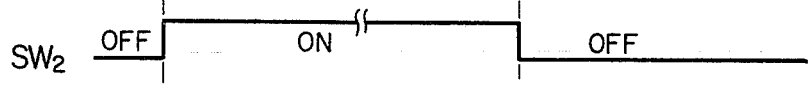
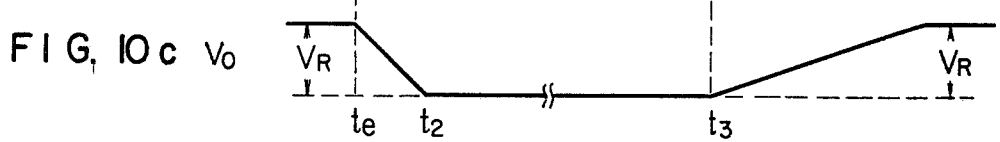
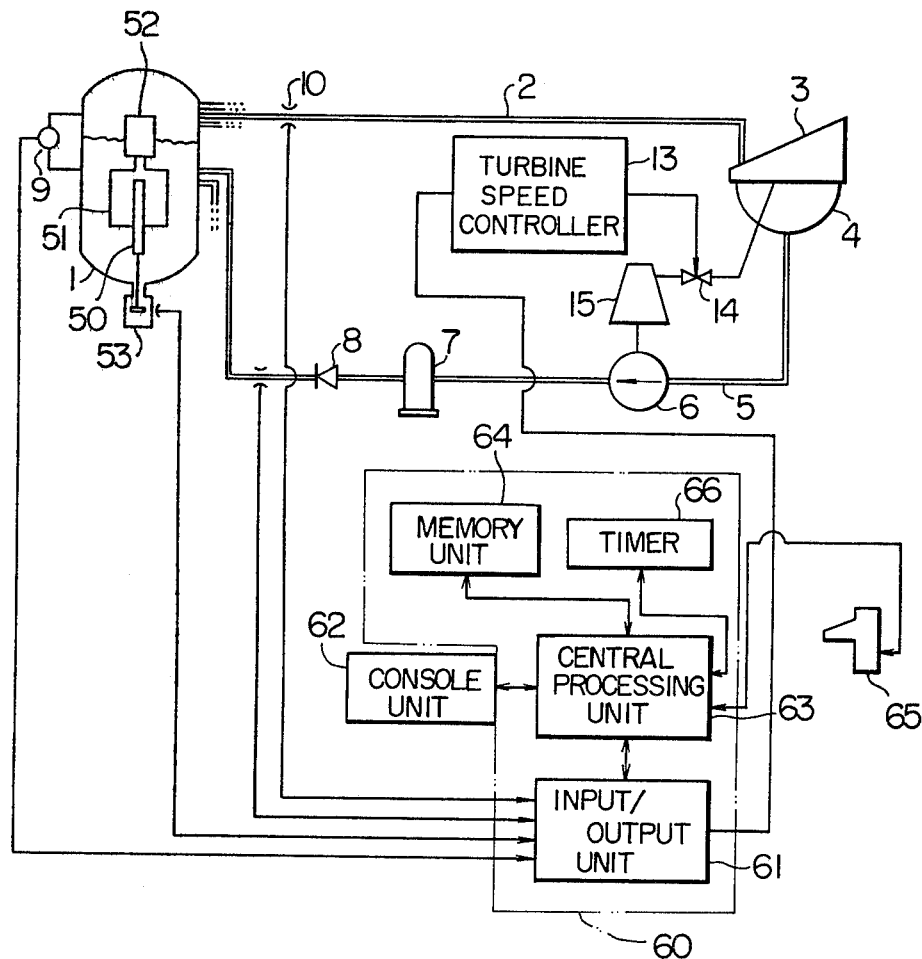

METHOD AND APPARATUS FOR CONTROLLING FEEDWATER FLOW TO STEAM GENERATING DEVICE

BACKGROUND OF THE INVENTION

1. Field of the Invention

This invention relates to a method and an apparatus for controlling feedwater flow to a steam generating device, and more particularly to a method and an apparatus for controlling feedwater flow to a nuclear reactor, which method and apparatus are suitable for preventing an excessive rise of the water level in the nuclear reactor in the event of a scram of the nuclear reactor.

2. Description of the Prior Art

Before a scram occurs in a nuclear reactor, steam bubbles of suitable amounts are present below the surface of water in the nuclear reactor, and the water level in the nuclear reactor is maintained substantially constant. However, in the event of a scram in the nuclear reactor, the source of heat supply in the nuclear reactor is quickly shut off, resulting in a quick decrease in the amounts of the steam bubbles, and this is followed by a great drop of the water level in the nuclear reactor. This variation in the water level is dependent upon the factors including the variation in the flow rate of main steam, the variation in the internal pressure of the nuclear reactor, and the variation in the flow rate of feedwater. Practical experiences have taught the fact that the water level in the nuclear reactor is not simply raised by the action of the valves including the main stop valves, the turbine control valves, and safety-relief valves but rises monotonously after repeating a rise and a fall a plurality of times.

It is desirable to maintain the water level in the nuclear reactor at its normal operation level even in the event of occurrence of such a transient phenomenon. However, once the water level exceeds the normal operation level, it is impossible to lower the water level again since the flow rate of main steam has been decreased. Further, suppression of the increase in the flow rate of feedwater for the purpose of preventing the undesirable excessive rise of the reactor water level in the event of the reactor scram results inevitably in various problems including an excessive drop of the reactor water level.

Various control methods have heretofore been employed to deal with such problems and one of such methods is disclosed in the Japanese laid-open patent publication No. 44793/78. According to one of the prior art control methods, the feedwater pump is tripped manually in a predetermined length of time after the nuclear reactor has scrammed.

According to another prior art control method, the set point of the water level is automatically lowered temporarily upon detection of the occurrence of the scram in the nuclear reactor. However, these prior art control methods have not been completely satisfactory, and stabilization of the water level at the desired normal operation level after its transient variation has been extremely difficult especially when the water level varies in a complex fashion.

SUMMARY OF THE INVENTION

It is therefore a primary object of the present invention to provide novel and improved method and apparatus for controlling feedwater flow to a stream generating device such as a nuclear reactor, which method and apparatus may reliably stabilize the water level in the steam generating device at the normal operation level upon disappearance of a transient phenomenon appeared as a result of tripping of the steam generating device.

According to one aspect of the present invention, there is provided a method of controlling feedwater flow to a steam generating device in a tripped condition of the steam generating device, comprising the steps of:

(a) arithmetically calculating a first forecast length of time required for the water level in the steam generating device to attain its desired normal operation level on the basis of the detected water level and the rate of variation of the water level when the detected water level in the steam generating device is lower than the desired normal operation level, the detected flow rate of feedwater is larger than that of the main steam, and the rate of variation of the water level is positive;

(b) arithmetically calculating a second forecast length of time required for the flow rate of feedwater to decrease to a predetermined flow rate on the basis of the detected feedwater flow rate, the detected main steam flow rate and a substantially constant rate of variation of the flow rate of feedwater;

(c) decreasing the level of the output signal of ramp signal generator means at a rate of variation corresponding to the substantially constant rate of feedwater flow rate variation when the time difference obtained by subtracting ½ of the second forecast length of time from the first forecast length of time becomes zero or negative; and (d) selecting either the output signal of the water level controller means for generating a control output signal on the basis of various input signals applied thereto including an input signal indicative of the flow rate of main steam, an input signal indicative of the flow rate of feedwater and an input signal indicative of the water level in the steam generating device or the output signal of the ramp signal generator means, which has a lower value than the other, to deliver it as the feedwater flow rate demand signal.

According to another aspect of the present invention, there is provided an apparatus for controlling feedwater flow to a steam generating device in a tripped condition of the steam generating device, comprising:

(a) water level controller means for generating a first control output signal on the basis of various input signals applied thereto including an input signal indicative of the flow rate of main steam detected, an input signal indicative of the flow rate of feedwater and an input signal indicative of the water level in the steam generating device;

(b) ramp signal generator means for generating a second control output signal of ramp waveform repeatedly rising and falling at respectively different but substantially constant rates of variation;

(c) signal control means including means for arithmetically calculating a first forecast length of time required for the water level in the steam generating device to attain its desired normal operation level on the basis of the detected water level and the rate of variation of the water level when the detected water level in the steam generating device is lower than the desired normal operation level and the rate of variation of the water level is positive, means for arithmetically calculating a second forecast length of time required for the flow rate of feedwater to decrease to a predetermined flow rate on the basis of the detected feedwater flow rate, the detected main steam flow rate and a substantially constant rate of variation of the flow rate of feedwater when the detected feedwater flow rate is larger than the detected main steam flow rate, and means for decreasing the level of the second control output signal of the ramp signal generator means at the substantially constant rate of variation when the time difference obtained by subtracting ½ of the second forecast length of time from the first forecast length of time becomes zero or negative; and (d) low value selector means receiving the first control output signal and the second control output signal for selecting one of the control output signals which has a lower value than the other, to deliver it as the feedwater flow rate demand signal.

BRIEF DESCRIPTION OF THE DRAWINGS

FIGS. 3a to 3e show operating waveforms appearing at various parts of the prior art feedwater flow control apparatus in a tripped condition of the steam generating device.

FIG. 4 is a block diagram showing the basic structure of a first embodiment of the feedwater flow control apparatus according to the present invention.

FIG. 6 is a flow chart showing the operation sequence in the signal control unit employed in the first embodiment of the present invention.

FIGS. 8a to 8g show operating waveforms appearing at various parts of the first embodiment of the feedwater flow control apparatus according to the present invention in a tripped condition of the steam generating device.

FIG. 9 is a circuit diagram showing one form of the practical structure of the ramp signal generator employed in the first embodiment of the present invention.

FIGS. 10a to 10c are a time chart illustrating the operation of the ramp signal generator shown in FIG. 9.

FIG. 11 is a block diagram showing the basic structure of a second embodiment of the feedwater flow control apparatus according to the present invention.

DETAILED DESCRIPTION OF THE INVENTION

For a better understanding of the present invention, a prior art feedwater flow control method as referred to hereinbefore will be described in detail before describing the present invention.

Figure 1:
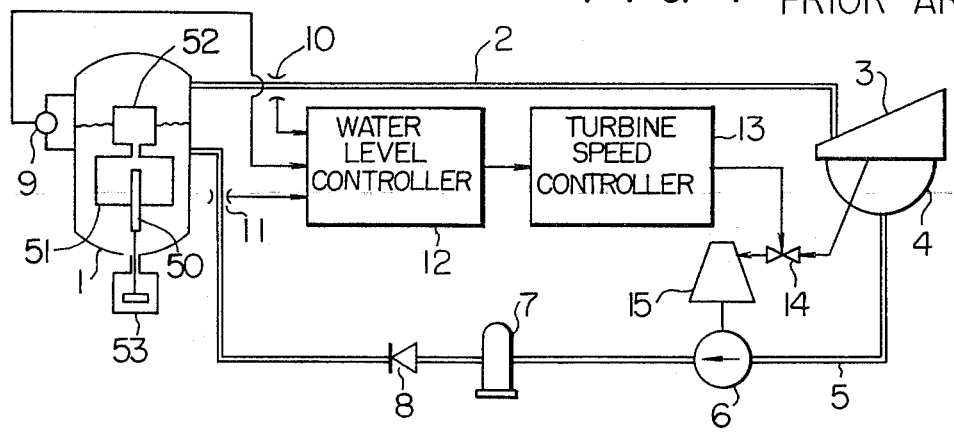
FIG. 1 is a block diagram showing the basic structure of a prior art apparatus for controlling feedwater flow to a steam generating device.

FIG. 1 is a block diagram showing the basic structure of a prior art feedwater flow control apparatus based on such a method.

Referring to FIG. 1, a drum type steam generating device 1, for example, a boiling water type nuclear reactor comprises control rods 50, a reactor core 51, a steam separator 52 and a control rod drive unit 53. Steam generated in the drum type steam generating device 1 passes through a main steam conduit 2 into a main turbine 3, and after producing the mechanical energy therein, the exhaust steam is fed into a condenser 4 to be turned into a condensate. This condensate passes through a feedwater conduit 5 into a feedwater pump 6, and the pressurized feedwater passes through a feedwater heater 7 and a check valve 8 to be returned into the drum type steam generating device 1 again. Although only one main steam conduit 2 is shown in FIG. 1, there are generally provided a plurality of such conduits 2. Also, there are generally provided a plurality of feedwater systems each including the feedwater pump 6, feedwater heater 7 and check valve 8 shown in FIG. 1.

The prior art method of controlling feedwater flow to the steam generating device 1 will now be described. Low-pressure steam extracted from the main turbine 3 is supplied through a turbine control valve 14 into a feedwater turbine 15 driving the feedwater pump 6. The feedwater pump 6 is directly mechanically connected to the feedwater turbine 15 so that, by controlling the turbine control valve 14, the rotating speed of the feedwater turbine 15 is varied to regulate the flow rate of feedwater delivered from the feedwater pump 6.

The turbine control valve 14 is controlled by a turbine speed controller 13 which is controlled by a water level controller 12. Output signals from a water level detector 9, a main steam flow rate detector 10 and a differential pressure transducer 11 are applied to the water level controller 12, and on the basis of these input signals, the water level controller 12 controls the turbine speed controller 13. That is, in the water level controller 12, the signal representing the difference between the detected flow rate of main steam and the detected flow rate of feedwater is added to the signal indicative of the water level deviation or error, and such a signal is applied to the turbine speed controller 13 to control the flow rate of feedwater. A water level setting element capable of manually setting any desired water level is incorporated in the water level detector 9, and the signal indicative of the water level setting is applied to the water level controller 12. This water level setting element is also used for the manual setting of the water level in the event of a reactor scram, besides the initial manual setting of the water level at the desired level.

It is the purpose of this feedwater flow control apparatus that variations in the water level in the nuclear reactor 1 due to power output variations as generally experienced during the normal operation can be controlled to lie within a predetermined range. Further, although the water level in the nuclear reactor 1 varies greatly in a scrammed condition of the nuclear reactor 1, the feedwater flow control apparatus is designed so that the feedwater system may not be tripped even in such a condition.

Figure 2:
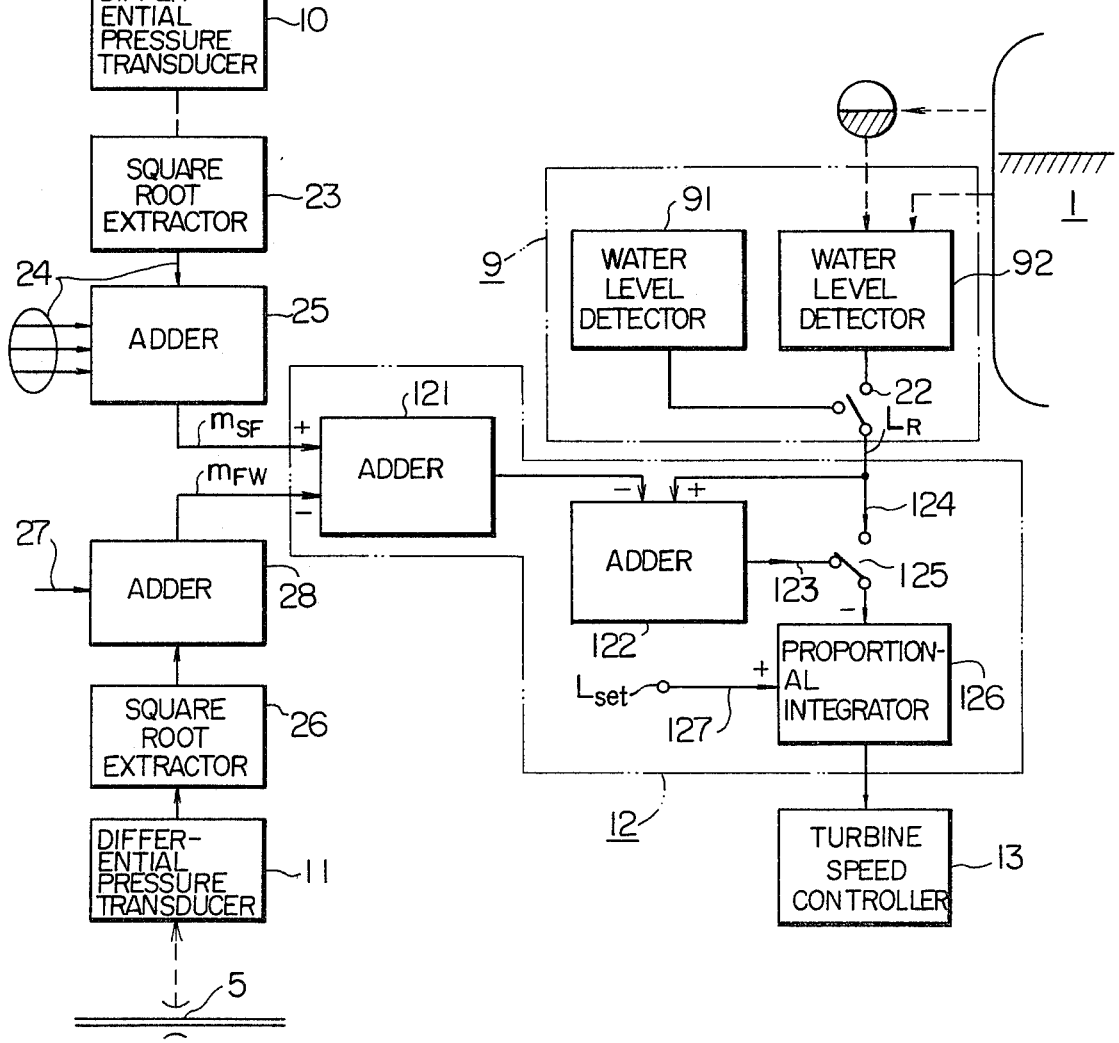
FIG. 2 is a system diagram showing in detail the structure of the prior art feedwater flow control apparatus shown in FIG. 1.

FIG. 2 is a system diagram showing in detail the structure of the feedwater flow control apparatus shown in FIG. 1 and such a system is disclosed in the Japanese laid-open patent publication No. 102495/78. The water level detector 9 detecting the water level in the steam generating device 1 comprises three water level detector elements, disposed in parallel, and one of the output signals from the two detector elements 91 and 92 among the three detector elements is selected to appear as the output signal 124 of the water level detector 9 by manually changing over a change-over switch 22. (The remaining one is preserved as a spare.) In FIG. 2, there are actually four main steam conduits 2. The main steam flow rate detector 10 associated with each of these four main steam conduits 2 detects the flow rate of main steam in the associated main steam conduit 2 and applies its output signal indicative of the flow rate of main steam to a square root extractor 23 which extracts the square root of the output signal of the main steam flow rate detector 10. The output signal 24 of the square root extractor 23 is applied to an adder 25 together with the similar signals 24 relating to the remaining three main steam conduits 2, so that the adder 25 provides an output signal indicative of the total flow rate of main steam flowing through the four main steam conduits 2. There are also two feedwater conduits 5. The feedwater flow rate detector associated with each of the feedwater conduits 5 detects the flow rate of feedwater in the associated feedwater conduit 5 and applies its output signal indicative of the feedwater flow rate to a square root extractor 26 which extracts the square root of the output signal of the differential pressure transducer 11. The output signal 27 of the square root extractor 26 is applied to an adder 28 together with the similar signal 27 relating to the other feedwater conduit 5, so that the adder 28 provides an output signal indicative of the total flow rate of feedwater flowing through the two feedwater conduits 5.

The output signal of the adder 28 is subtracted from the output signal of the adder 25 in an adder 121 included in the water level controller 12, and the output signal of the adder 121 is subtracted from the output signal 124 of the water level detector 9 in another adder 122 included in the water level controller 12. Consequently, a three-element control signal 123 (an error signal) appears from the adder 122 to be applied through a change-over switch 125 to a proportional integrator 126. The output signal 124 of the water level detector 9 may be directly applied to the proportional integrator 126 through the change-over switch 125 changed over to the other position, so that the one-element control signal 124 may be applied to the proportional integrator 126 especially when the steam generating device 1 is operating in a low load condition to provide a low power output. Even when the steam generating device 1 is operating in a high load condition to deliver a high power output, the one-element control signal 124 may be applied to the proportional integrator 126 without substantially tripping the steam generating device 1. However, the steam generating device 1 is generally placed under the three-element control in such an operating condition so as to improve the control performance. Thus, the change-over switch 125 acts as a one-element control/three-element control change-over means. Either the error signal 123 or the error signal 124 is applied through the change-over switch 125 to the proportional integrator 126 to which the signal 127 indicative of the desired normal operation water level $L_{Set}$ is also applied. The proportional integrator 126 provides an output signal representing the result of arithmetic calculation on these input signals, and this signal is applied from the proportional integrator 126 to the turbine speed controller 13.

As described hereinbefore, it is the purpose of the feedwater flow control apparatus that variations in the water level in the steam generating device 1 due to power output variations as generally experienced during the normal operation of the steam generating device 1 can be controlled to lie within the predetermined range. Although the water level in the steam generating device 1 varies greatly in the tripped or scrammed condition of the steam generating device 1, the feedwater flow control apparatus is so designed that the feedwater system may not be tripped even in such a condition.

The mode of variation in the water level in the steam generating device 1 in a tripped or scrammed condition of the steam generating device 1 will be described with reference to FIGS. 3a to 3e. Before the steam generating device 1 trips or scrams, steam bubbles of suitable amounts are present below the surface of water in the steam generating device 1, and the water level is maintained substantially constant. A trip signal as shown in FIG. 3a appears when the steam generating device 1 trips or scrams. The source of heat supply to the steam generating device 1 is quickly shut off, resulting in a quick decrease in the amounts of the steam bubbles, and this is followed by a great drop of the water level in the steam generating device 1. This great drop of the water level is detected by the water level detector 9, and the level of the output signal of the water level controller 12 increases in a manner as shown in FIG. 3b. Consequently, the flow rate of feedwater flowing through the feedwater conduits 5 increases in a manner as shown in FIG. 3c, and the water level in the steam generating device 1 is gradually raised. The flow rate of main steam flowing through the main steam conduits 2 decreases after the steam generating device 1 has tripped or scrammed. As a result of reduction in the pressure losses in the main steam conduits 2, the internal pressure of the steam generating device 1 is lowered until finally boiling of water under a reduced pressure occurs, and the water level rises in a manner as shown in FIG. 3d.

On the other hand, the integrating element in the water level controller 12 holds still the integrated quantity for some time in spite of the drop of the water level in the steam generating device 1. Therefore, the signal demanding the feedwater flow rate decrease does not appear as soon as the water level is restored to the normal operation level, but appears with a slight delay time. Further, a length of time is required before the flow rate of feedwater starts to decrease, due to the presence of a dead zone in the initial stage of the feedwater flow rate decreasing action. For these reasons, the water level in the steam generating device 1 will exceed the normal operation level until finally the turbines 3 and 15 will be tripped. In the tripped condition of the turbines 3 and 15, the flow rate of main steam flowing from the steam generating device 1 to the main turbine 3 is substantially null, and the flow rate of feedwater flowing from the condenser 4 to the steam generating device 1 is also substantially null. The water level in the steam generating device 1 is now out of the controllable range, and it is impossible to restore the water level to the normal operation level again unless a suitable discharge unit provided external to the steam generating device 1 is actuated to discharge excess water from the steam generating device 1.

On the other hand, it is primarily unnecessary to trip the turbines 3 and 15 in the tripped or scrammed condition of the steam generating device 1, and it is naturally desirable from the viewpoint of plant operation to avoid quick closure of the main stop valves in response to a turbine trip signal appearing as a result of a rise of the water level to an excessively high water level, which exceeds the pre-set turbine trip level TL shown in FIG. 3d, due to the trip or scram of the steam generating device 1. A method for obviating the above situation is known, according to which the value of the water level set by the setting element in the water level controller 12 regulating the water level in the steam generating device 1 is automatically decreased, and after a predetermined length of time, the reduced setting is manually restored to the original value. According to this method, the rise of the water level due to oversupply of feedwater can be avoided to prevent the turbines 3 and 15 from being tripped due to the excessively high water level. This method is, however, defective in that it is difficult to stabilize the water level at its normal operation level.

In the novel and improved feedwater flow control method and apparatus according to the present invention which obviates the defect of the prior art method and apparatus, the length of time $T_e$ lapsed until the flow rate of feedwater starts to decrease after the steam generating device 1 has tripped or scrammed and the water level starts to rise, it forecasts by arithmetic calculation as soon as the water level starts to rise, and when the relation $T_e \leq 0$ holds, the flow rate of feedwater is decreased at a predetermined rate of decrease $a_{FW}[\%/S]$, thereby reliably stabilizing the water level at the desired normal operation level.

FIG. 4 is a block diagram showing the structure of a first embodiment of the present invention. The feedwater flow control apparatus shown in FIG. 4 is generally similar to the prior art apparatus shown in FIG. 1 except that a control unit 100 is additionally provided. This control unit 100 comprises a low value selector 16, a signal controller 17 and a ramp signal generator 18. Referring to FIG. 4, the low value selector 16 is connected at one of its inputs to the output of the water level controller 12 and at the other input to the output 35 of the ramp signal generator 18, so that either the output signal of the water level controller 12 or the output signal of the ramp signal generator 18, which has a lower value than the other, is selected to be applied to the turbine speed controller 13 as the feedwater flow rate demand signal. The signal controller 17 controls the rates of rise and fall of the ramp signal generated from the ramp signal generator 18 and controls also the operation of the ramp signal generator 18, such as, generation of the ramp signal and cessation of the signal generation. This signal controller 17 is conveniently in the form of a digital control computer of small size.

As will be apparent from the later description, this signal controller 17 receives various status signals and carries out specific processing on these input signals to provide an output signal which actuates the ramp signal generator 18. The mode of signal processing by this signal controller 17 will now be described. Various status signals applied to the signal controller 17 are sampled and subjected to digital processing.

Therefore, the mode of operation of the signal controller 17 with a predetermined sampling period will be described, by way of example.

After the steam generating device 1 has tripped or scrammed, the water level drops and then starts to rise. It is assumed herein that the rate of rise $\Delta L_R/\Delta t$ of water level from the dropped water level $L_R$ to the desired normal operation level $L_{set}$ persists until the water level rises up to the desired level $L_{set}$. Then, the length of time to be lapsed until the water level rises up to the desired normal operation water level $L_{set}$, that is, the forecast length of time $T_1$ required for the water level to attain the desired level $L_{set}$ is given by $$T_1 = \frac{L_{set} - L_R}{\Delta L_R/\Delta t} (S) \quad (1)$$

Figure 5:
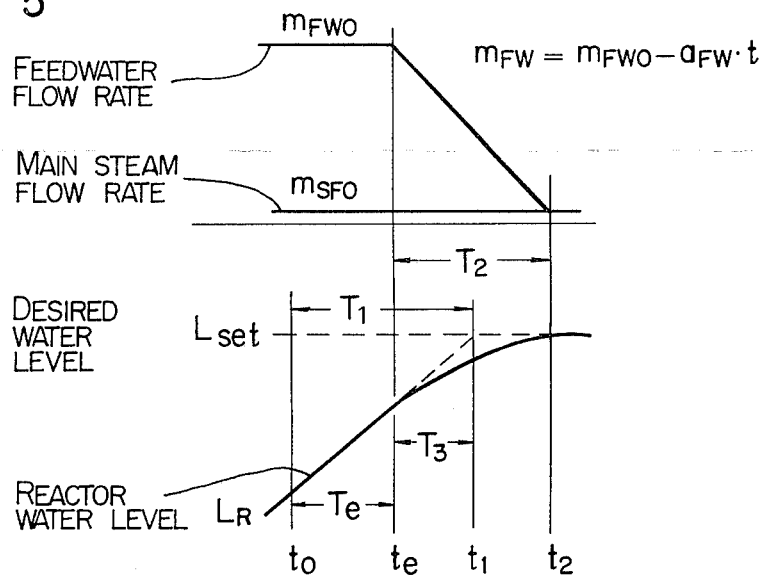
FIG. 5 illustrates the principle of the water level stabilization control according to the present invention.

FIG. 5 illustrates the principle of the water level stabilization control according to the present invention. Referring to FIG. 5, $T_2$ designates the forecast length of time required for decreasing the flow rate of feedwater to a predetermined flow rate, and $T_3$ designates the forecast length of time required for the water level to rise to the desired normal operation water level $L_{set}$ from the feedwater flow-rate decrease starting time $t_e$ without any decrease in the flow rate of feedwater. Thus, the length of time $T_e$ to be lapsed until the flow rate of feedwater starts to decrease is represented by the relation $T_e = T_1 - T_3$. Suppose then that $a_{FW}[\%/S]$ is the maximum possible constant rate of decreasing the flow rate of feedwater, and $m_{FW}[\%]$ and $m_{SF}[\%]$ are the flow rate of feedwater and the flow rate of main steam respectively in such a condition. Then, the forecast length of time $T_2$ required for satisfying the relation $m_{FW} = m_{SF}$ is given by $$T_2 = (m_{FWO} - m_{SFO})/a_{FW}[S] \quad (2)$$

The amount of feedwater supplied during the period of time of from the time $t_e$, at which the flow rate of feedwater starts to decrease, to the time $t_2$, at which the water level is stabilized at the desired normal operation water level $L_{set}$, is expressed as follows:

$$\int_{t_e}^{t_1}(m_{FWO} - m_{SFO})\,dt = \int_{t_e}^{t_2}(m_{FWO} - m_{SFO})\,dt = \int_{t_e}^{t_2}(m_{FWO} - a_{FW}\cdot t - m_{SFO})\,dt \quad (3)$$

Therefore, the following equations hold:

$$(m_{FWO} - m_{SFO}) \cdot T_3 = -\frac{a_{FW}}{2} \cdot T_2^2 + (m_{FWO} - m_{SFO})T_2$$

$$T_3 = \frac{-a_{FW}}{2(m_{FWO} - m_{SFO})} \cdot \left(\frac{m_{FWO} - m_{SFO}}{a_{FW}}\right)^2 + \frac{(m_{FWO} - m_{SFO})}{a_{FW}}$$

$$T_3 = \frac{m_{FWO} - m_{SFO}}{2a_{FW}} + \frac{m_{FWO} - m_{SFO}}{a_{FW}} = \frac{m_{FWO} - m_{SFO}}{2a_{FW}}$$

$$\therefore T_e = \frac{L_{set} - L_R}{\Delta L_R/\Delta t} - \frac{m_{FWO} - m_{SFO}}{2a_{FW}} [S]$$

It can therefore be seen that $T_e$ is expressed as $T_e = T_1 - (T_2/2)$. Thus, according to the present invention, the length of time $T_e$ to be lapsed until the flow rate of feedwater starts to decrease, is arithmetically calculated at the time at which the water level starts rising again after the water level in the steam generating device 1 has dropped due to the trip or scram, and at the time at which the relation $T_e \leq 0$ holds, the ramp signal generator 18 is instructed to generate the ramp signal of the waveform conforming to the rate of variation or decrease $a_{FW}$ of the flow rate of feedwater so that the water level can be reliably stabilized at the desired normal operation water level $L_{set}$.

Although the equation (3) represents a simple formula for arithmetically calculating the value of $T_e$, this calculation formula has such an advantage that $T_e$ is independent of the size of the steam generating device 1. This is because, during the period of time in which the water level is rising at the constant rate, the internal pressure of the steam generating device 1 is substantially constant, and also, the amount of the steam bubbles present below the water surface is very small and substantially constant, so that any consideration need not be paid to the effect of pressure reduction.

FIG. 6 is a flow chart illustrating the task of the signal controller 17 controlling the ramp signal generator 18 when a digital control computer is used as this signal controller 17. This task is periodically run by actuating the control section of the control computer.

Referring to FIG. 6, decisions are made as to whether the following conditions are satisfied:

(1) Has a scram occurred?

(2) Is the water level $L_R$ in the steam generating device 1 lower than the desired normal operation water level $L_{set}$?

(3) Is the rate of water level variation $\Delta L_R/\Delta t$ positive?

(4) Is the feedwater flow rate $m_{FW}$ larger than the main steam flow rate $m_{SF}$?

(Is the gradient upward?)

(5) Is the output signal of the ramp signal generator 18 in its upper limit (about 110% in terms of the output signal of the water level controller 12)?

When all of the five items specified above are proved to be satisfied as the result of the above procedure, the length of time $T_e$ to be lapsed until the flow rate of feedwater starts decreasing is arithmetically calculated, and when the calculated value of $T_e$ is positive, an output representing this value of $T_e$ appears or is displayed so that the operator can identify the value of $T_e$. The value of $T_e$ is arithmetically calculated at each samplying time so as to improve the accuracy of control.

The ramp signal generator 18 is actuated as soon as the relation $T_e \leq 0$ holds. The rate of variation $a_{FW}$ of the ramp signal waveform may be pre-set at a highest possible rate which can be followed by the turbine speed controller 13. Selection of a highest possible value of $a_{FW}$ is preferable for stabilizing the water level as quick as possible.

Figure 7:
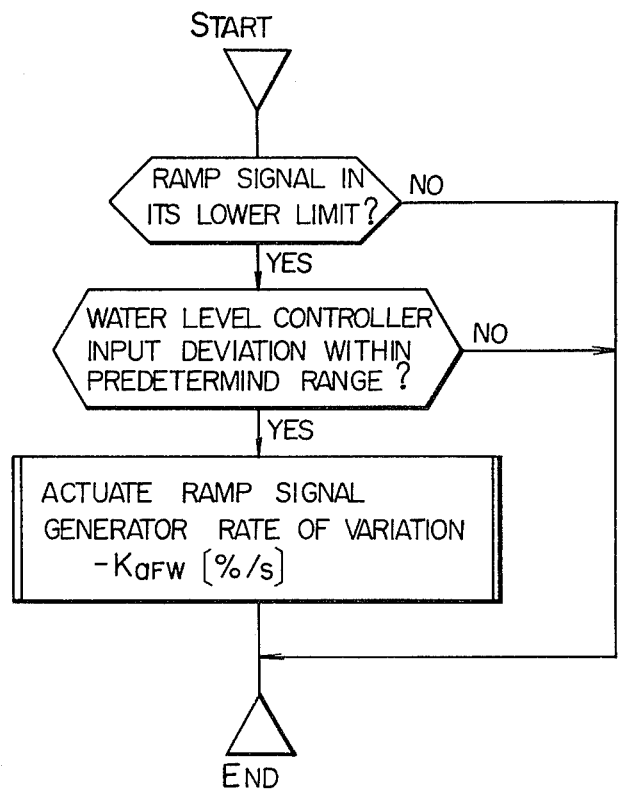
FIG. 7 is a flow chart showing the restoration sequence in the signal control unit employed in the first embodiment of the present invention.

Restoration steps are illustrated in FIG. 7. Decisions are made as to whether the following conditions are satisfied:

(1) Is the ramp signal in its lower limit (0% in terms of the output signal of the water level controller 12)?

(2) Is the deviation of the feedwater flow rate input signal to the water level controller 12 within a predetermined range (for example, within ±5%)?

When all of the two items specified above are proved to be satisfied as the result of the above procedure, the ramp signal generator 18 is actuated again so that its output signal waveform varies now with a rate of variation $-k \cdot a_{FW}[\%/S]$. It is desirable to select the value of the coefficient k to be about $k \approx 0.1$.

FIGS. 8a to 8g show operating waveforms appearing at the various parts of the feedwater flow control apparatus after the steam generating device 1 has tripped or scrammed. It will be seen that FIGS. 8a to 8g are generally similar to FIGS. 3a to 3e in the portions in which the water level in the steam generating device 1 drops and starts to rise again after the application of the scram signal to the control rod drive unit 53 shown in FIG. 4.

At time $t_0$ at which the water level in the steam generating device 1 starts to rise, the forecast length of time $T_e$ to be lapsed until the flow rate of feedwater starts to decrease is arithmetically calculated. At time $T_e$ at which the relation $T_e = 0$ holds, the ramp signal waveform starts varying with the rate of variation $a_{FW}[\%/S]$.

At time $t_1$, the ramp signal attains its lower limit, and such a ramp signal is applied to the turbine speed controller 13 through the low value selector 16. At time $t_2$, the water level in the steam generating device 1 is stabilized at the desired normal operation water level $L_{set}$. At time $t_3$, the deviation of the input to the water level controller 12 is now within the predetermined range of, for example ±5%. At this time $t_3$, the ramp signal waveform varying with the rate of variation $-k \cdot a_{FW}$ appears from the ramp signal generator 18 again, and, during the period of time in which the ramp signal has its rising waveform the output signal of the water level controller 12 is selected by the low value selector 16. At time $t_4$, therefore, the turbine speed controller 13 is now controlled by the three-element control system.

FIG. 9 shows one form of the practical structure of the ramp signal generator 18, and FIGS. 10a to 10c are a time chart illustrating the operation of the ramp signal generator 18.

Referring to FIG. 9, the ramp signal generator 18 comprises an operational amplifier OP, input resistors $R_1$, $R_2$, a feedback capacitor C, and switches $SW_1$, $SW_2$ and zener diodes $ZD_1$ and $ZD_2$. Normally, the switch $SW_1$ is in its on state as shown in FIG. 10a, and the remaining switch $SW_2$ is in their off state as shown in FIGS. 10b.

Therefore, the capacitor C is charged by the zener voltage of the zener diode $ZD_2$, which zener voltage is selected to be a voltage value $V_R$ corresponding to a command for a feedwater flow rate of 110%, and the output signal $V_o$ of the ramp signal generator 18 is normally at a voltage level $V_R$ indicative of the 110% feedwater flow rate. Consequently, the output signal of the water level controller 12 is selected by the low value selector 16 to appear as the output signal of the low value selector 16.

After the occurrence of a scram of the nuclear reactor 1, when the length of time $T_e$ to be lapsed until the flow rate of feedwater starts to decrease becomes zero or negative, that is, at time $t_e$ in FIG. 10b, the switch $SW_1$ is turned off, and at the same time, the switch $SW_2$ is turned on. Consequently, the output signal level $V_o$ of the ramp signal generator 18 is decreased gradually due to the discharge with a specific time constant. This time constant corresponds to the aforementioned coefficient $a_{FW}$. This coefficient $a_{FW}$ can be set at any desired value by suitably selecting the time constant $CR_1$ determined by the resistance of the resistor $R_1$ and the capacitance of the capacitor C.

The output signal $V_o$ of the ramp signal generator 18 is applied to the low value selector 16, and as soon as the level of the output singal $V_o$ of the ramp signal generator 18 becomes lower than that of the output signal of the water level controller 12, such an output signal $V_o$ of the ramp signal generator 18 is now selected by the low value selector 16 to provide the normal control input signal to the turbine speed controller 13, in lieu of the output signal of the water level controller 12.

At time $t_2$, the water level in the steam generating device 1 is stabilized at the desired normal operation water level $L_{set}$, and at time $t_3$, the nuclear reactor 1 is re-started. At this time $t_3$, the switch $SW_2$ is turned off, while, at the same time, the switch $SW_1$ is turned on again, and the output signal level $V_o$ of the ramp signal generator 18 starts to increase due to the charge with another specific time constant $CR_2$. This time constant $CR_2$ is larger than the aforementioned time constant $CR_1$, so that the output signal level $V_o$ of the ramp signal generator 18 is restored to the voltage level $V_R$ at a rate slower than in the level decrease.

It is needless to say that the ramp signal generator 18 may have any other suitable structure provided that its output signal $V_o$ varies in a mode as shown in FIG. 10c.

A second embodiment of the feedwater flow control apparatus according to the present invention will now be described.

FIG. 11 is a block diagram showing the structure of the second embodiment of the feedwater flow control apparatus according to the present invention, in which a control computer is employed for the feedwater flow control. This second embodiment is actually a modification of the first embodiment shown in FIG. 4.

Referring to FIG. 11, a signal indicative of the water level $L_R$ in the steam generating device or nuclear reactor 1, a signal indicative of the feedwater flow rate $m_{FW}$, a signal indicative of the main steam flow rate $m_{SF}$ and a scram signal SR are applied to a control computer 60. In response to the appearance of the scram signal SR, the control rod drive unit 53 acts to quickly insert all the control rods 50 into the reactor core 51 so as to shut off the nuclear power from the reactor core 51. The scram signal SR only is digital signal, and the remaining process signals above described are analog signals. These signals are applied to an input/output unit 61 (hereinafter referred to as I/O unit 61) in the control computer 60. Besides the I/O unit 61, the control computer 60 comprises a central processing unit 63, a memory unit 64, a console unit 62 and a timer 66. The central processing unit 63 controls all of the units 61, 64 and 66 in response to the application of instruction signals from the console unit 62. The central processing unit 63 is connected also to a typewriter 65 to receive instruction signals from the typewriter 65.

The console unit 62 is provided to generate various instruction signals including an instruction signal for automatically starting the control and instruction signals applied directly to the central processing unit 63, and the typewriter 65 is provided for on-line alterations of programs and printing a message in the event of occurrence of an unusual operating condition during the processing in the computer 60. The result of arithmetic calculation in the computer 60 appears as an output signal from the I/O unit 61 to actuate the turbine speed controller 13.

In the first place, the console unit 62 is manipulated to actuate the timer 66, and consequently, the control computer 60 starts operating. The timer 66 generates a sampling pulse at every predetermined sampling period $T_S$. At the start of operation of the timer 66, the initial value $y_o$ stored in the memory unit 64 is read out and supplied to the turbine speed controller 13 through the I/O unit 61.

Figure 12:
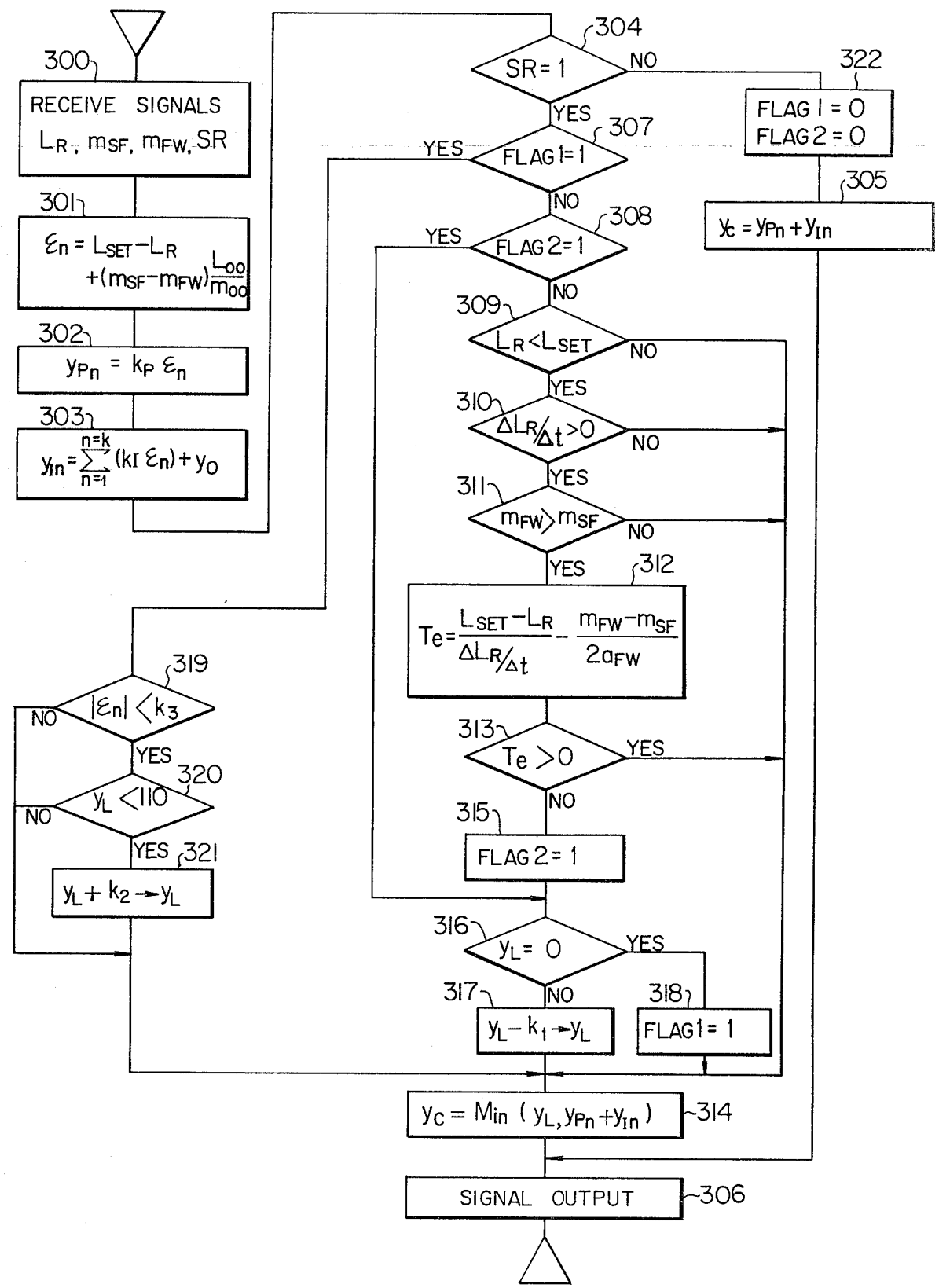
FIG. 12 is a flow chart showing the operation sequence in the signal control unit employed in the second embodiment of the present invention.

Next, in response to the application of the automatic control starting instruction signal from the console unit 62 to the central processing unit 63, a series of processings as shown in FIG. 12 are executed at every sampling period mentioned above. The manner of processing is such that the process signals indicative of $L_R$, $m_{SF}$, $m_{FW}$ and SR are applied to the central processing unit 63 from the I/O unit 61 at STEP 300.

Subsequently, at a step designated by 301 the the controlled deviation or error $\epsilon_n$ is arithmetically calculated, as follows:

$$\epsilon_n = L_{set} - L_R + (m_{SF} - m_{FW}) \times (L_{oo}/m_{oo}) \quad (5)$$

where $L_{Set}$ is the reactor water level setting, and $L_{oo}/m_{oo}$ is the mismatching gain. Thse values are also read out from the memory unit 64.

At steps designated by 302 and 303, the PI calculations are then executed, as follows:

$$y_{In} = k_P \epsilon_n \quad (6)$$

$$y_{In} = \sum_{n=1}^{k} (k_I \cdot \epsilon_n) + y_o \quad (7)$$
$$= y_{I(n-1)} + k_I \cdot \epsilon_n$$

where $y_{Pn}$ is the output of the proportional element, $y_{In}$ is the output of the integral element, $k_P$ is the proportional gain, $k_I$ is the integral gain, and $y_o$ is the initial output value.

The values of $k_P$, $K_I$ and $y_o$ are also read out from the memory unit 64. The value of $y_{I(n-1)}$ representing the result of integration up to the preceding sampling time is read out from the memory unit 64, and the value of $y_{In}$ arithmetically calculated by the integrating element is stored in the memory unit 64.

Next, at a step designated by 304, it is determined that the received scram signal SR is either "1" or "0". Prior to the occurrence of the scram, the scram signal SR is "0" and the step is advanced to a step designated by 322. At the step 322, FLAG 1 and FLAG 2 are set at "0", and then at the step designated by 305, the following arithmetic calculation is made, $$y_c = y_{Pn} + y_{In} \quad (8)$$

where $y_c$ represents a control output. At a step designated by 306 the control output is supplied from I/O unit 61 to the feedwater control device 13.

In the event of the scram of the nuclear reactor, the scram signal SR is "1". After decisions of FLAG 1 and FLAG 2 are made at steps designated by 307 and 308, respectively, the following conditions are determined at steps designated by 309, 310, and 311:

1. Is the water level ($L_R$) of the steam generating device 1 lower than the desired normal operation water level ($L_{set}$)?
2. Is the rate of water level variation $\Delta L_R/\Delta t$ positive?
3. Is the feedwater flow rate $m_{FW}$ larger than the main steam flow rate $m_{SF}$?

When all the above conditions are satisfied, at a step designated by 312 the feedwater flow-rate decrease starting time $T_e$ is arithmetically calculated by the equation (3).

Next, at a step designated by 313 the polarity of the feedwater flow-rate decrease starting time $T_e$ is determined. In the case that the value of $T_e$ is positive or that the above conditions are not satisfied, the step is advanced to a step designated by 314.

At a step designated by 314 the smaller one of the values $y_L$ and $(y_{Pn} + y_{In})$ is selected as a control output $y_c$ according to the following relation $$y_c = \text{Min}(y_L, y_{Pn} + y_{In}) \quad (9)$$

where $y_L$ represents a predetermined value which is stored in the main memory unit in advance and initially set at the value corresponding to the feedwater flow rate of 110% with respect to the rated flow rate.

When the value of $T_c$ is not positive, at a step designated by 315 FLAG 2 is set at "1" to indicate the start of decrease of the value $y_L$, and at a step designated 317 the value $y_L$ is reduced in accordance with the following relation $$y_L - k_1 \rightarrow y_L \tag{10}$$

where $k_1$ is arithmetically calculated from the following equation (11) with respect to the sampling period $T_s$ and the variation rate $a_{FW}$ and stored in the memory unit 64 in advance, $$k_1 = a_{FW}/T_s \tag{11}$$

Once FLAG 2 is set at "1", from the next sampling period the step is advanced direct to a step designated by 316, depending on the determination made at a step designated by 308. At a step designated by 317 the value $y_L$ is reduced at every sampling period in accordance with the relation (10).

When a step designated by 316 has determined that the value $y_L$ is zero, at a step designated by 318 FLAG 1 is set at "1" and at the next sampling period, the step is advanced from the step 307 to a step designated by 319, and then it is determined whether the value $y_L$ is to be increased or not.

In the first place, with respect to the controlled deviation or error $\epsilon_n$ derived from the previous calculation, the following relation is determined at a step designated by 319.

$$|\epsilon_n| < k_3 \tag{12}$$

where $k_3$ represents a predetermined value stored in the memory unit 64,

If the above relation (12) is satisfied, at a step designated by 321 the value $y_L$ is increased at every sampling period in accordance with the following relation $$y_L + k_2 \rightarrow y_L \tag{13}$$

where $k_2$ is arithmetically calculated by the following equation with respect to the sampling period $T_s$ and the variation rate $-k a_{FW}$ and stored in the memory unit 64 in advance, $$k_2 = T_s \cdot k \cdot a_{WF}/T_s \tag{14}$$

Such increase of the value $y_L$ is repeated at every sampling period unit it is determined at a step designated by 320 that the value $y_L$ is continuously or stepwise restored to the value corresponding to the feedwater flow rate of 110% with respect to the rated flow rate.

Finally, the ramp signal $y_L$ and the control output signal $y_{Pn} + y_{In}$ of the proportional integrator are compared with each other, and the lower value is selected, as follows: The signal thus selected is applied to the turbine speed controller 13 through the I/O unit 61 of the control computer 60.

Although the present invention has been specifically described with reference to its application to a nuclear reactor, it is apparent that the present invention is equally effectively applicable to a thermal power plant. In such a case, the object of application is a drum type steam generating device in a general expression.

It will be appreciated from the foregoing detailed description of the present invention that the water level in a nuclear reactor transiently varying after the nuclear reactor has scrammed can be reliably stabilized at the desired normal operation water level without regard to the gradient of the water level restoration curve. It will also be appreciated that no malfunction occurs even when noise signal is superposed on the water level signal. Thus, the present invention exhibits great industrial effects when applied to nuclear reactor water level control systems and like systems.

We claim:

1. A method of controlling feedwater flow to a nuclear steam generating device in a tripped condition of the steam generating device, comprising the steps of:
   (a) arithmetically calculating a first forecast length of time required for the water level in the steam generating device to attain its desired normal operation level on the basis of the detected water level and the rate of variation of the water level when said detected water level in the steam generating device is lower than said desired normal operation level, the detected flow rate of feedwater is larger than that of the main steam, and said rate of variation of the water level is positive;
   (b) arithmetically calculating a second forecast length of time required for the flow rate of feedwater to decrease to a predetermined flow rate on the basis of the detected feedwater flow rate, the detected main steam flow rate and a substantially constant rate of variation of the flow rate of feedwater;
   (c) decreasing the level of the output signal of ramp signal generator means at a rate of variation corresponding to said substantially constant rate of feedwater flow rate variation when the time difference obtained by subtracting ½ of said second forecast length of time from said first forecast length of time becomes zero or negative; and
   (d) selecting either the output signal of said water level controller means for generating a control output signal on the basis of various input signals applied thereto including an input signal indicative of the flow rate of main steam, and input signal indicative of the flow rate of feedwater, and an input signal indicative of water level in the steam generating device or the output signal of the ramp signal generator means, which has a lower value than the other to deliver it as the feedwater flow rate demand signal.

2. A method of controlling feedwater flow to a steam generating device according to claim 1, further comprising the step of restoring the level of the output signal of said ramp signal generator means to the original level at a rate smaller than said rate of feedwater flow rate variation when the level of said feedwater flow rate signal applied to said water level controller means is decreased to lie within a predetermined range.

3. A method of controlling feedwater flow to a steam generating device according to claim 2, wherein said rate of feedwater flow rate variation is selected to decrease the flow rate of feedwater in a stepwise fashion.

4. An apparatus for controlling feedwater flow to a nuclear steam generating device in a tripped condition of the steam generating device, comprising
   (a) water level controller means for generating a first control output signal on the basis of various input signals applied thereto including an input signal indicative of the flow rate of main steam detected by associated detecting means, an input signal indicative of the flow rate of feedwater detected by associated detecting means and an input signal indicative of the water level in the steam generating device detected by associated detecting means;

(b) ramp signal generator means for generating a second control output signal of ramp waveform repeatedly rising and falling at respectively different but substantially constant rates of variation;

(c) signal control means including means for arithmetically calculating a first forecast length of time required for the water level in the steam generating device to attain its desired normal operation level on the basis of the detected water level and the rate of variation of the water level when said detected water level in the steam generating device is lower than said desired normal operation level and said rate of variation of the water level is positive, means for arithmetically calculating a second forecast length of time required for the flow rate of feedwater to decrease to a predetermined flow rate on the basis of the detected feedwater flow rate, the detected main steam flow rate and a substantially constant rate of variation of the flow rate of feedwater when said detected feedwater flow rate is larger than said detected main steam flow rate, and means for decreasing the level of said second control output signal of said ramp signal generator means at corresponding to said substantially constant rate of feedwater flow rate variation when the time difference obtained by subtracting ½ of said second forecast length of time from said first forecast length of time becomes zero or negative; and (d) low value selector means receiving said first control output signal and said second control output signal for selecting either of said control output signals which has a lower value than the other to deliver it as the feedwater flow rate demand signal.

* * * * *